United States Patent

[11] 3,568,066

[72] Inventor Noriaki Fujimura
Tokyo, Japan
[21] Appl. No. 742,897
[22] Filed July 5, 1968
[45] Patented Mar. 2, 1971
[73] Assignee Fujitsu Limited
Kawasaki, Japan
[32] Priority July 7, 1967
[33] Japan
[31] 42-43 775

[54] FREQUENCY MULTIPLE DIFFERENTIAL PHASE MODULATION SIGNAL RECEIVER
6 Claims, 6 Drawing Figs.

[52] U.S. Cl. .......... 325/320, 178/88, 325/349, 328/133
[51] Int. Cl. .......... H04l 27/14
[50] Field of Search .......... 325/30, 60, 320, 418, 419, 399; 178/66, 61, 88; 328/133, 134

[56] References Cited

UNITED STATES PATENTS

| | | | |
|---|---|---|---|
| 3,353,101 | 11/1967 | Kawai et al. .......... | 325/320 |
| 3,368,036 | 2/1968 | Carter et al. .......... | 178/67 |
| 3,445,593 | 5/1969 | Gray et al. .......... | 325/60 |

*Primary Examiner*—Robert L. Griffin
*Assistant Examiner*—Benedict V. Safourek
*Attorneys*—Curt M. Avery, Arthur E. Wilfond, Herbert L. Lerner and Daniel J. Tick

ABSTRACT: First and second phase detectors detect the phase of the input signal and utilize a first demodulating reference signal and a second reference signal having a phase difference of 90° from the first reference signal. A first integrator is connected to the first phase detector and a second integrator is connected to the second phase detector. A sampling circuit connected to the first and second integrators samples the outputs thereof and shapes the waveforms of the output. A signal generator generates a single reference signal. Third and fourth phase detectors detect the phase of the input signal utilizing the single reference signal and a fourth reference signal having a phase difference of 90° from the single reference signal. A third integrator is connected to the third phase detector and a fourth integrator is connected to the fourth phase detector. A first holding circuit is connected to the third integrator and a second holding circuit is connected to the fourth integrator. Each holding circuit holds a signal for a determined period. A first modulator connected to the first holding circuit modulates the output signals thereof with the single reference signal. A second modulation connected to the second holding circuit modulates the output signals thereof with the fourth reference signal. A combining circuit connected between the first and second modulators and each of the first and second phase detectors combines the output signals of the modulators.

FREQUENCY MULTIPLE DIFFERENTIAL PHASE MODULATION SIGNAL RECEIVER

DESCRIPTION OF THE INVENTION

Figure 1:
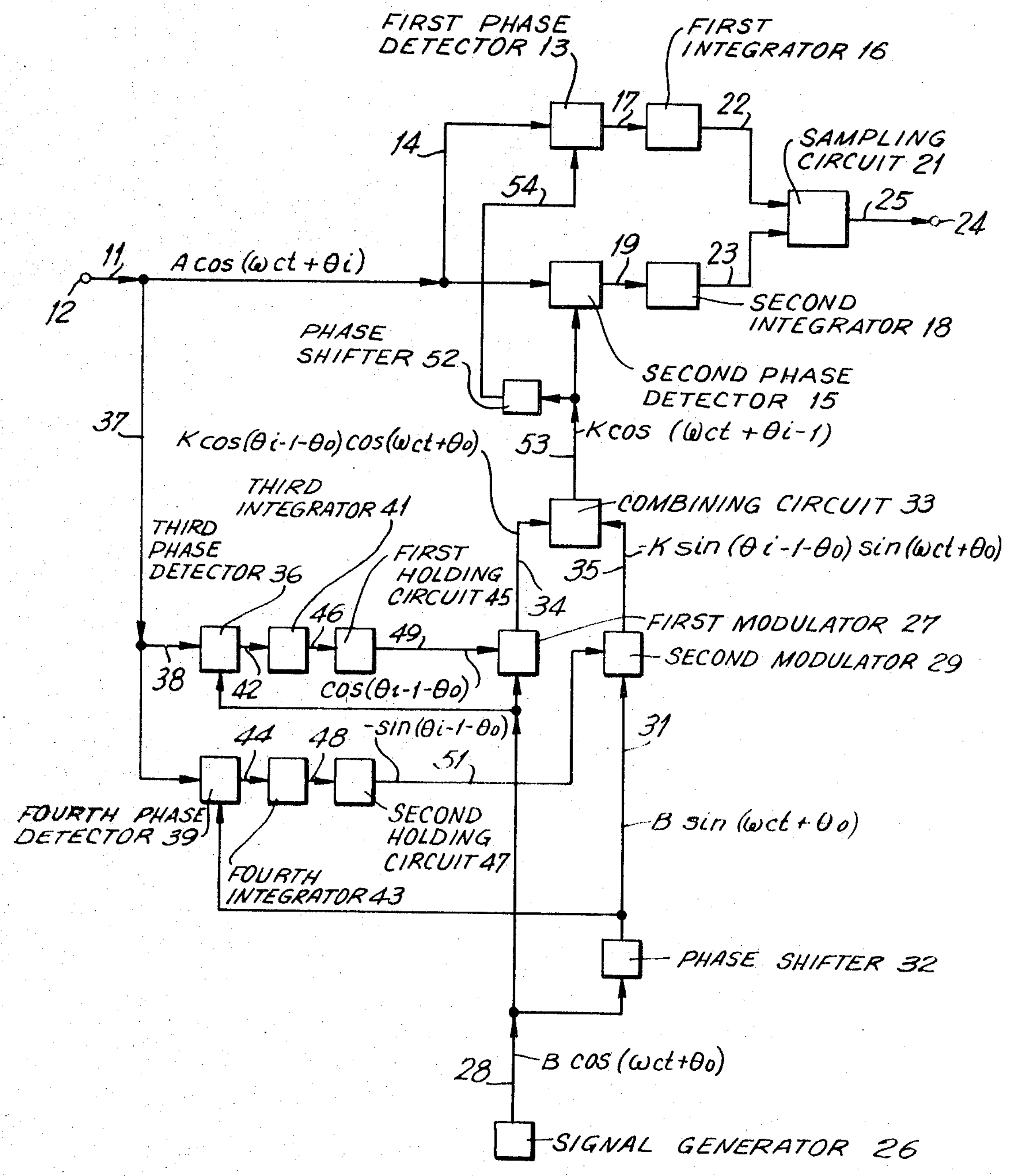

The present invention relates to a circuit for delayed detection of frequency multiplexed signals. More particularly, the invention relates to a frequency multiple differential phase modulation signal receiver.

In the receiver of the present invention, digital signals of a plurality of channels are differential phase modulated and frequency multiplexed and transmitted from the transmitter to the receiver, where they are received. In a frequency multiple system, the channels are ordinarily separated by band-pass filters. In a phase modulation system for digital signals, however, the channels may be separated without utilizing a filter. Such a system is exemplified by the kineplex system of the Collins Radio Company, described in the U.S. Pat. No. 2,905,812, and the rectiplex system of the Kokusai Denshin Denwa Kabushiki Kaisha, described in the U.S. Pat. No. 3,353,101. In these systems, the channels are separated by an integrating function of the circuit. This method of separation is advantageous, since the frequency band may be utilized effectively due to the absence of a channel separating filter. Furthermore, an expensive filter is not necessary and may be eliminated.

In the aforementioned system, frequency of the carrier waves of the channels are provided at a constant interval. Each frequency is equal to an odd number of times of half an interval between frequencies. An interval $\omega o$ between frequencies is related to the frequency $\omega ck$ of the carrier wave of the $k$th channel, as indicated in equation (1).

$$\omega_{ok}=\frac{\omega_0}{2}(2k+l) \qquad (1)$$

The foregoing equation defines the condition for separating channels without the need for a filter. The input signals are supplied to the demodulating circuits or demodulators of the corresponding channels and are detected and integrated by utilizing the corresponding demodulating reference signals of the channels. The frequency of a reference signal is equal to the frequency of the carrier wave of the channel. The detected signal provided by the demodulating circuit includes the difference frequency or beat component between the input and reference signals and the sum frequency component of said signals. The detected output of a channel other than itself has a frequency equal to an integer times $\omega o$ defined by equation (1). That is, when the frequency of the reference signal is $\omega cr$ and the input signal is $\omega ck$, the frequency of the sum frequency component is derived from equation (1) and is as follows:

$$\omega ck+\omega cr\frac{\omega o}{2}=(2k+1)+\frac{\omega o}{2}(2r+1)=\omega o(k+r+1) \qquad (2)$$

and the frequency of the difference frequency component is $$\omega ck-\omega cr=\frac{\omega o}{2}(2k+1)-\frac{\omega o}{2}(2r+1)=\omega o(k-r) \qquad (3)$$

Since $r$ is not equal to $k$, each of the frequencies is equal to an integer times $\omega o$. If the result is integrated for a constant period of time T, which is equal to $2\pi/\omega o$, the integral becomes zero. This is evident from equation (4):

$$\int_0^{2\pi/\omega o} A\cos(N\omega ot+\theta)\,dt,$$

where $N$ is an integer not equal to zero $$=A[\sin(N2\pi+\theta)-\sin\theta]=0 \qquad (4)$$

With regard to the signal component of the channel itself, since the frequency of the signal is equal to the frequency of the reference signal, so that $k$ equals $r$, the frequency of the difference frequency component becomes zero and the output includes a DC component. The DC component is determined by the phase difference between the input signal and the reference signal. Since the input signal is phase modulated, the information signal may be derived by determining the level of the DC component at the integrated output.

In the aforedescribed system, there are difficulties involved in generating the demodulating reference signal and in detecting the phase difference. In such system, the phase difference must be detected between the phase of a specific element and the phase of the next-prededing element in time. In a single carrier wave phase modulation system, a delayed detection system is utilized as the simplest modulating method. The product of a signal provided by delaying the input signal by the length or duration of one element, utilizing a delay line, and another signal which is not delayed, is provided. In this system, the demodulating reference signal may be generated simultaneously with the detection of the phase difference.

In a frequency multiple system, in which the channels are not separated by a filter, it is impossible to provide detection by utilizing a delay line in the aforedescribed manner. This is due to the fact that the input signals comprise the signals of a plurality of channels mixed with each other and do not constitute a single frequency. Thus, even if the input signals are delayed, they cannot be utilized as the demodulating reference signals. In the rectiplex system, for example, the reference signal may be provided by detecting the phase shift of the reference signal utilizing the output of an integrator or integrating circuit, which constitutes the demodulated signal. An automatic phase control circuit, hereinafter referred to as an APC circuit, is connected to an oscillator which produces the reference signal. The phase difference may be derived by including a phase modulating circuit or modulator in a demodulating reference signal circuit and controlling the operation of the phase modulating circuit with the output signal of the next-preceding element in time.

The system which utilizes an APC circuit has the disadvantages of such APC circuit. An APC circuit is delicate and complex and complicated in operation. Furthermore, if the APC circuit comes out of phase, a long period of time is required to pull the phase back to stability. Sometimes the phase cannot be pulled back to stability. The operation of an APC circuit is slow.

The principal object of the present invention is to provide a new and improved frequency multiple differential phase modulation signal receiver.

An object of the present invention is to regenerate the demodulating reference signal in a frequency multiple differential phase modulation signal receiver without utilizing an APC circuit.

An object of the present invention is to provide a frequency multiple differential phase modulation signal receiver which is similar to a delayed detection system of a single carrier wave phase modulation system which is adapted to frequency multiplexed phase modulation operation.

An object of the present invention is to provide a frequency multiple differential phase modulation signal receiver which avoids the disadvantages and shortcomings of similar systems of the prior art.

Another object of the present invention is to provide a frequency multiple differential phase modulation signal receiver which functions with accuracy, efficiency and reliability.

In accordance with the present invention, the input signals are demodulated utilizing a single reference signal and a reference signal having a phase difference of 90° from the single reference signal. The demodulated output signal is held for a determined constant period of time. The reference signals are modulated by the held output signal. The input signal is then phase detected utilizing the modulation signals as the demodulating reference signals.

In accordance with the present invention, a frequency multiple differential phase modulation signal receiver comprises a demodulating circuit for demodulating a received input signal. The demodulating circuit comprises first and second phase detecting circuits for detecting the phase of the input signal. The phase detecting circuits utilize a first demodulating reference signal and a second reference signal having a phase difference of 90° from the first demodulating reference signal. A first integrating circuit is connected to the first phase detecting circuit and a second integrating circuit is connected to the second phase detecting circuit. A sampling circuit connected to the first and second integrated circuits samples the outputs of the integrating circuits and shapes the waveform of the outputs. The receiver further comprises a demodulating reference signal circuit comprising a signal generator for generating a single reference signal. Third and fourth phase detecting circuits detect the phase of the input signal utilizing the single reference signal and a fourth reference signal having a phase difference of 90° from the single reference signal. A third integrating circuit is connected to the third phase detecting circuit and a fourth integrating circuit is connected to the fourth phase detecting circuit. A first holding circuit is connected to the third integrating circuit and a second holding circuit is connected to the fourth integrating circuit. Each of the holding circuits holds a signal for a determined period. A first modulator is connected to the first holding circuit for modulating the output signals of the first holding circuit with the single reference signal. A second modulator is connected to the second holding circuit for modulating the output signals of the second holding circuit with the fourth reference signal. A combining circuit connected between the first and second modulators and each of the first and second phase detecting circuits combines the output signals of the modulators.

The third integrating circuit and the first holding circuit are combined and the fourth integrating circuit and the second holding circuit are combined. Each of the combined circuits comprises two integrating circuits, switch means connected to the integrating circuits and a switch control for controlling the switch means to integrate and hold signals supplied thereto. The switch means may comprise either a single switch or a plurality of switches.

In another embodiment of the invention, the receiver comprises an adding circuit connected to each of the first and second integrating circuits for adding signals supplied by the integrating circuits. A subtracting circuit is connected to each of the first and second integrating circuits in parallel with the adding circuit for subtracting signals supplied by the integrating circuits, one from the other. A first sampling and shaping circuit is connected to the adding circuit. A second sampling and shaping circuit is connected to the subtracting circuit. An OR circuit is connected to the first and second sampling and shaping circuits.

Figure 2A:
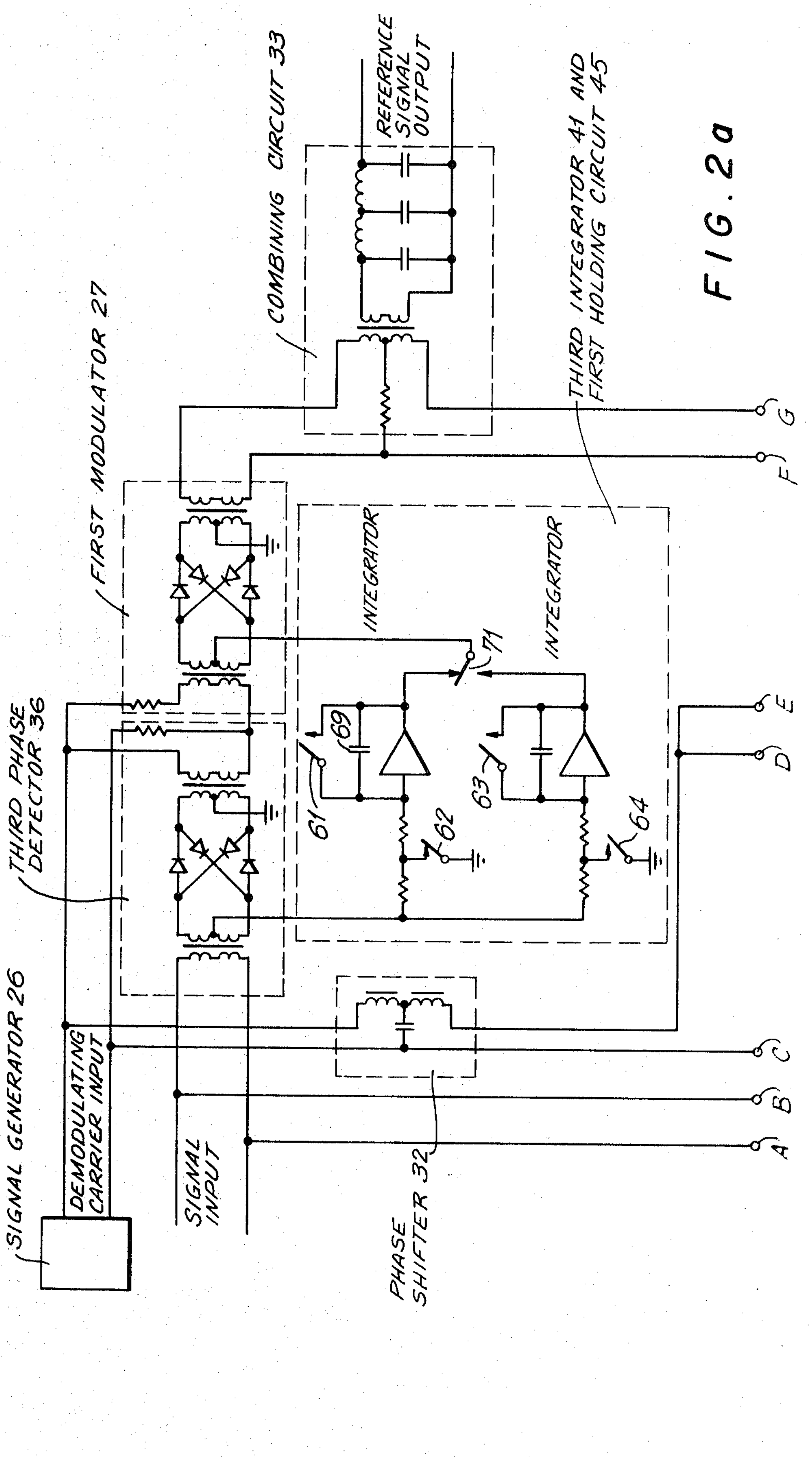
Figure 2B:
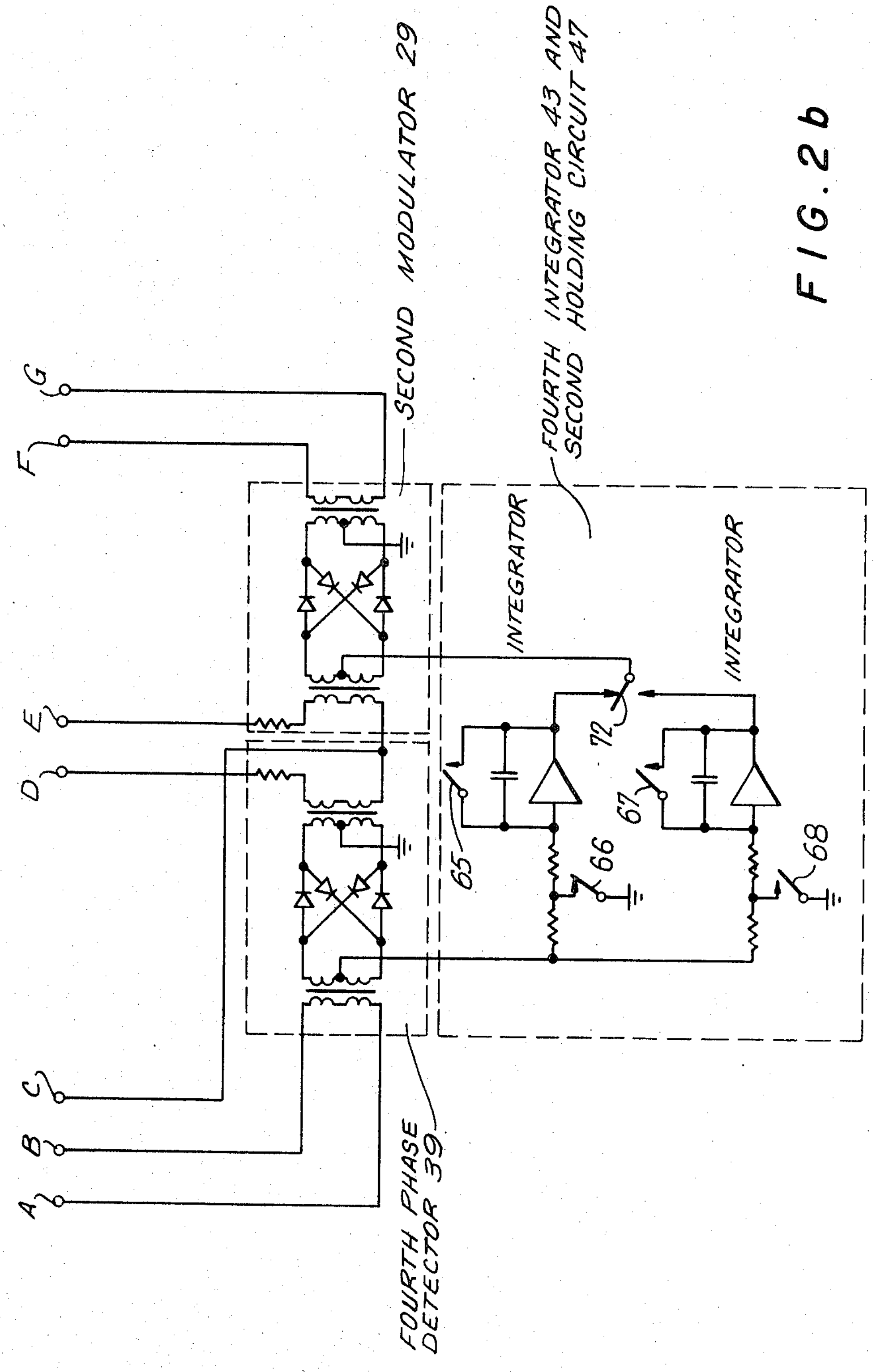
Figure 3A:
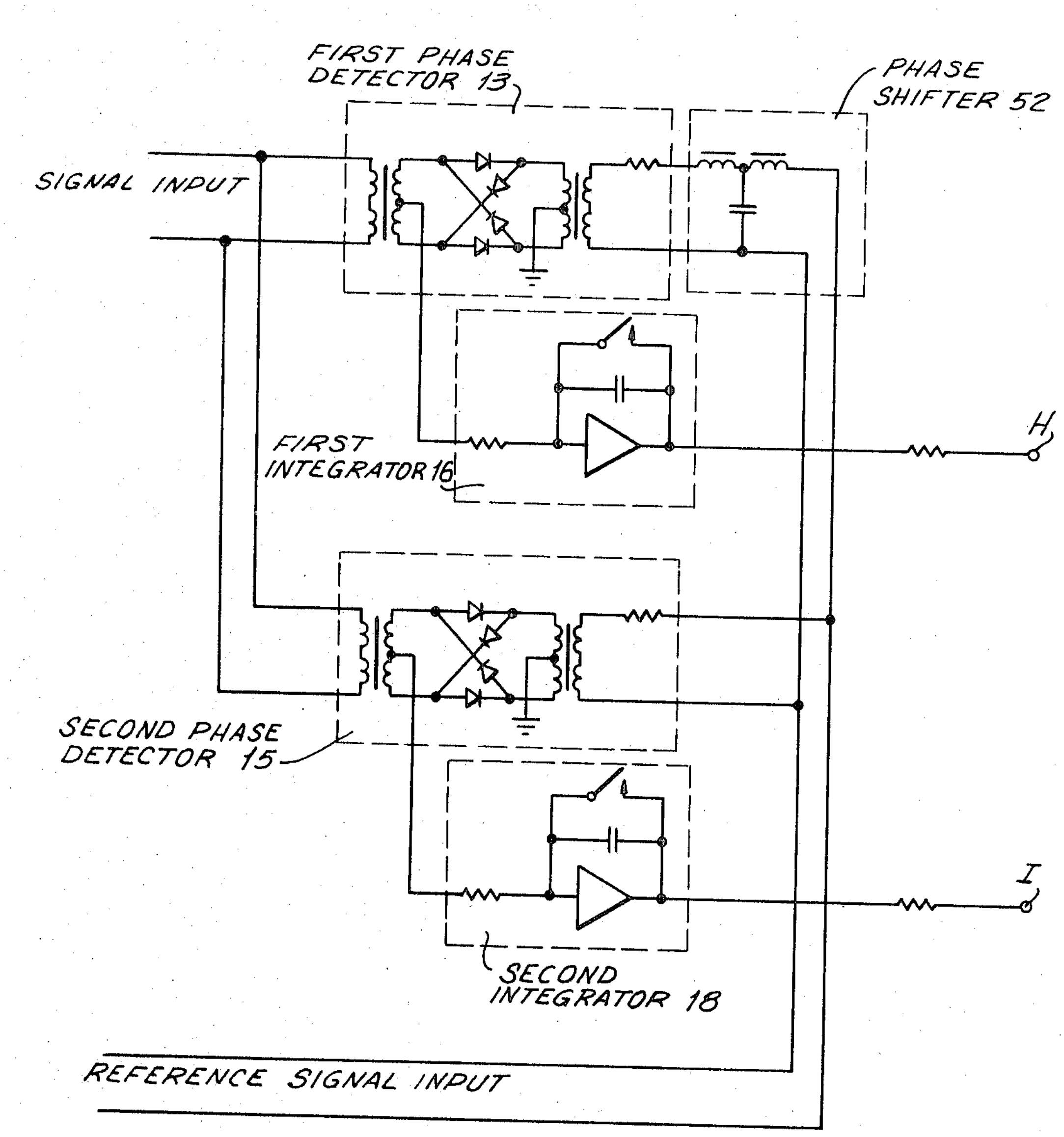
Figure 3B:
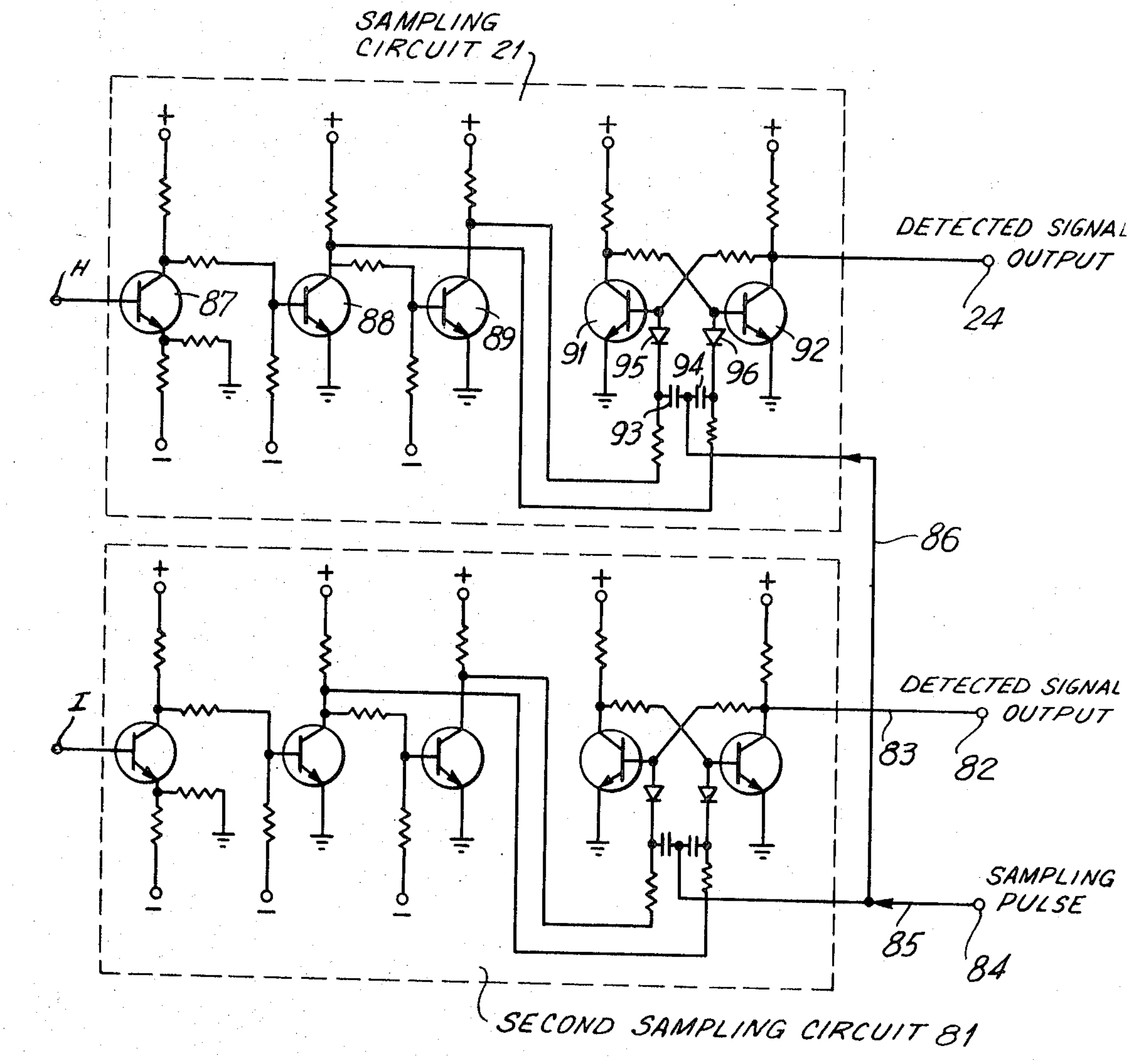
Figure 4:
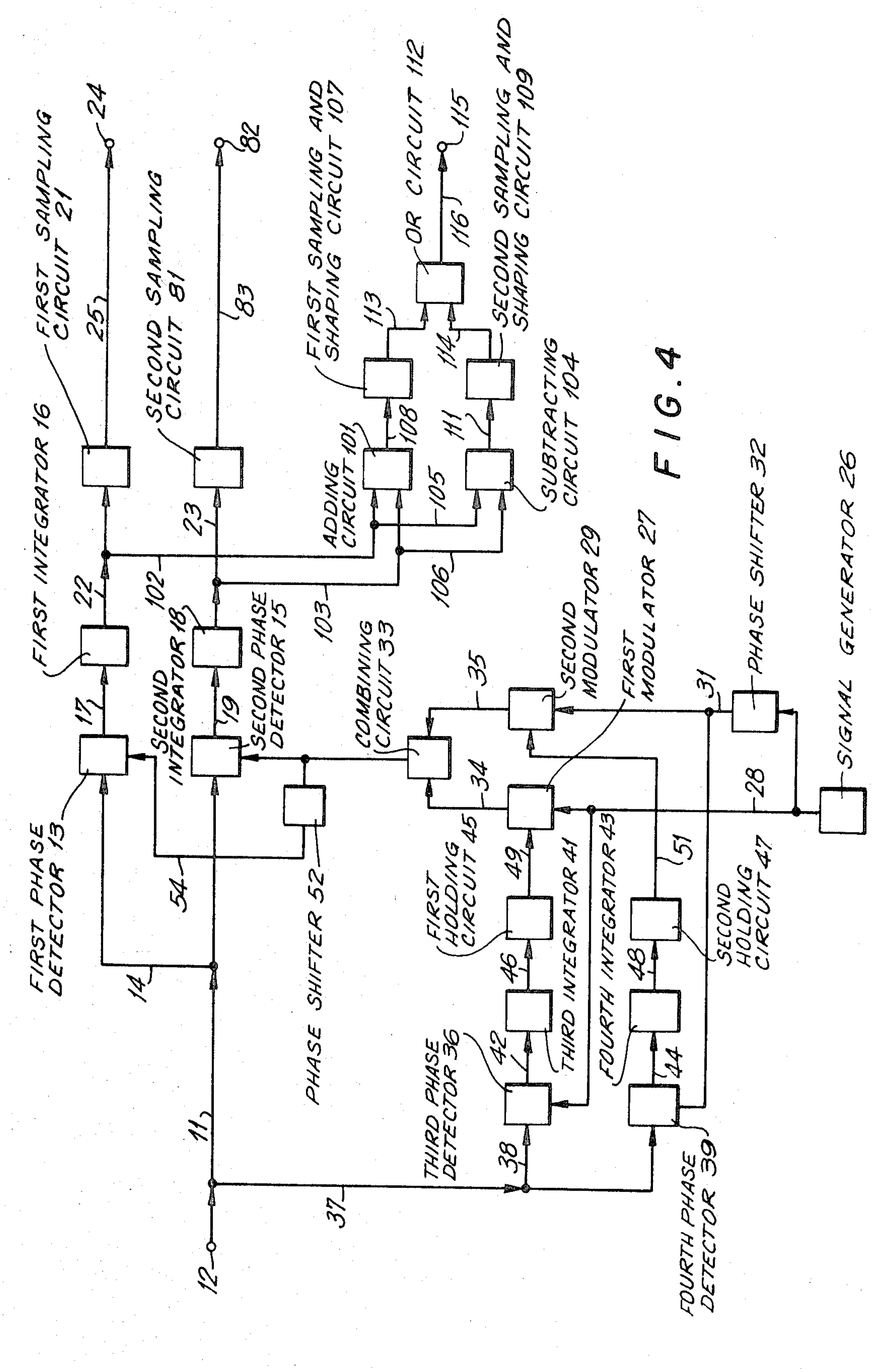

In order that the present invention may be readily carried into effect, it will now be described with reference to the accompanying drawings, wherein:

FIG. 1 is a block diagram of an embodiment of the frequency multiple differential phase modulation signal receiver of the present invention;

FIGS. 2*a* and 2*b*, together constituting a single circuit, present a circuit diagram of part of the embodiment of FIG. 1;

FIGS. 3*a* and 3*b*, which together constitute a single circuit, present a circuit diagram of another part of the embodiment of FIG. 1; and FIG. 4 is a block diagram of another embodiment of the frequency multiple differential phase modulation signal receiver of the present invention.

In the FIGS., the same components are identified by the same reference numerals.

In FIG. 1, input signals are supplied to the receiver via an input lead 11 from an input terminal 12. The input signals are supplied to a first phase detector 13 via the lead 11 and a lead 14 and to a second phase detector 15 via the lead 11. The first phase detector 13 detects the phase of the input signal and supplies an output signal to a first integrator 16 via a lead 17. The second phase detector 15 detects the phase of the input signal and supplies an output to a second integrator 18 via a lead 19.

The first and second integrators 16 and 18 function to integrate the signals supplied to them for a determined specific period of time. The integrated signals provided by the first and second integrators 16 and 18 are not affected by interchannel interference. A sampling circuit 21 is connected to the outputs of the first and second integrators 16 and 18 via leads 22 and 23, respectively. The sampling circuit functions to sample and shape the output signals of the first and second integrators 16 and 18 and provides demodulation pulse waveforms at an output terminal 24 via a lead 25. The sampling circuit 21 may comprise a relay circuit, for example.

The demodulating reference signals in FIG. 1 are provided by the phase modulation of the output signal produced by a signal generator or oscillator 26. The phase modulation is accomplished by a first modulator 27 connected to the output of the signal generator 26 via a lead 28 and a second modulator 29 connected to the output of said signal generator via the lead 28, a lead 31 and a phase shifter 32 connected in the lead 31. A combining circuit 33 is connected to the outputs of the first and second modulators 27 and 29 via leads 34 and 35, respectively.

The output of the combining circuit 33 has the same phase as the input signal. Therefore, if the output of the combining circuit is utilized to provide demodulation, such demodulation appears as the phase difference between the element and the next-preceding element and results in correct differential phase detection.

The output signal of the signal generator 26 is modulated as follows. The input signals at the input terminal 12 are supplied to a third phase detector 36 via the lead 11, a lead 37 and a lead 38. The input signals are also supplied to a fourth phase detector 39 via the leads 11 and 37. The output signal of the signal generator 26 is also supplied to an input of the third phase detector 36 and, via the phase shifter 32, to an input of the fourth phase detector 39. The detected signal provided by the third phase detector 36 is supplied to a third integrator 41 via a lead 42 and the detected signal provided by the fourth phase detector 39 is supplied to a fourth integrator 43 via a lead 44.

The integrated signal provided by the third integrator 41 is supplied to a first holding circuit 45 via a lead 46 and the integrated signal provided by the fourth integrator 43 is supplied to a second holding circuit 47 via a lead 48. Each of the holding circuits 45 and 47 functions to hold the integrated signal during the period of the signal of the next-succeeding element. In other words, the output of each of the first and second holding circuits 45 and 47 corresponds to the phase of the next-preceding element in time.

The output signals of the holding circuits 45 and 47 are maintained at a constant magnitude during the period of the element of a specific signal and are supplied to the first and second modulators 27 and 29 via leads 49 and 51, respectively. The level of the output signals operates the first and second modulators 27 and 29 to provide the reference signals utilized to modulate the information signals. The phase shifter 32 shifts the phase of a signal supplied to it by 90°. A phase shifter 52 also functions to shift the phase of a signal supplied to it by 90°. The phase shifter 52 is connected between the output of the combining circuit 33 and an input to the first phase detector 13 via leads 53 and 54. The output of the combining circuit 33 is directly connected to an input of the second phase detector 15 via the lead 53.

The operation of the aforedescribed system is expressed by the following equations. If the carrier wave of the input signal is coincident with the frequency of oscillation of the signal generator 26, the input signal is $$A\cos(\omega ct+\theta i) \quad (5)$$

and the output signal of the signal generator 26 is $$B \cos(\omega ct + \theta o) \quad (6)$$

The demodulating reference signal provided by the third phase detector 36 is that expressed by equation (6). The reference signal provided by the fourth phase detector 39 is derived, however, by shifting the phase of the output signal of the signal generator 26 by 90°, so that the waveform of said reference signal is $$B \cos(\omega ct + \theta o - 90°) = B \sin(\omega ct + \theta o) \quad (7)$$

The output signals of the holding circuits 45 and 47 are provided by demodulating the signal of the next-preceding element by operation of the corresponding phase detector and integrator of each of said holding circuits. The output signal $H$ of the first holding circuit 45 is $$H = \cos(\theta i{-}1 - \theta o) \quad (8)$$

and the output signal $H'$ of the second holding circuit 47 is $$H' = -\sin(\theta i{-}1\ \theta o) \quad (9)$$

wherein $\theta i{-}1$ is the phase of the next-preceding element. The first and second modulators 27 and 29 are operated by these levels of DC.

The output signal $M$ of the first modulator 27 is $$M = K \cos(\theta i{-}1 - \theta o) \cos(\omega ct + \theta o) \quad (10)$$

and the output signal $M'$ of the second modulator 29 is $$M' = -K \sin(\theta l{-}1 - \theta A \sin(\omega ct + \theta o) \quad (11)$$

wherein $K$ is a constant determined by $A\ B$.

The output $R$ of the combining circuit 33 may thus be expressed as $$R = M + M' = K \cos(\omega ct + \theta i{-}1) \quad (12)$$

Equation (12) represents the waveform having the phase of the next-preceding element. That is, the waveform of equation (12) may be utilized as the reference signal for demodulating the information signal without relation to the phase of the output signal produced by the signal generator 26. Even if the frequency of the carrier wave is slightly different from the frequency of the oscillator 26, it may be approximated as a type of phase shift and an almost correct reference signal may be provided by the aforedescribed circuit.

The output signal of the second phase detector 15 is expressed as $$A \cos(\omega ct + \theta i) K \cos(\omega ct + \theta i - 1) = \frac{AK}{2}[\cos(2\omega ct + \theta i + \theta i - 1) + \cos(\theta i - \theta i - 1)] \quad (13)$$

The output signal of the second integrator 18 is expressed as $$\frac{AK}{2}\int_0^{2\pi} \cos(2\omega ct + \theta i + \theta i - 1) + \cos(\theta i - \theta i - 1) = AK\pi \cos(\theta i - \theta i - 1) \quad (14)$$

The output signal of the first integrator 16 is expressed as $$AK\pi \cos(\theta i - \theta i{-}1 - 90°) \quad (15)$$

The phases of the channels are detected and the waveforms are shaped by the sampling circuit 21, which supplies an output signal at the output terminal 24.

In FIGS. 2a and 2b, the blocks correspond to those of FIG. 1 and illustrate the circuits of the blocks of FIG. 1. FIGS. 2a and 2b illustrate the demodulating reference signal circuit of the receiver of FIG. 1. In FIGS. 2a and 2b, the first and second modulators 27 and 29 and the third and fourth phase detectors 36 and 39 each comprises known ring modulators utilizing diodes.

The third integrator 41 and the first holding circuit 45 (FIG. 2a) are combined and the fourth integrator 43 and the second holding circuit 47 (FIG. 2b) are combined, and each of these combined circuits comprises two integrators or integrating circuits and two switches. Each integrating circuit comprises a Miller integrator having a resistor, a capacitor and a DC amplifier. The integrating circuit is reset and the holding operation of the holding circuit is controlled in each case by the corresponding switches 61 and 62, 63 and 64, 65 and 66, and 67 and 68. Thus, utilizing the first integrator of FIG. 2a as an example, when the switch 61 is closed or in its conductive condition, the capacitor 69 discharges and the integrated output signal of said first integrator of the combined circuits 41 and 45 becomes zero. If the switch 62 is closed or in its conductive condition, the input signal is blocked and the integrated output signal of the first integrator of the combined circuits 41 and 45 holds the next-preceding condition.

The two integrators of the combined circuits 41 and 45 of FIG. 2a are switched by a switch 71 and the two integrators of the combined circuits 43 and 47 of FIG. 2b are switched by a switch 72. In each combined circuit, an integrator and a holding circuit are required. The integrator integrates the signal of a specific element and transfers its output signal to the holding circuit at the end of the element and then integrates the signal of the next-succeeding element. The holding circuit holds the transferred integrated output signal during the period of the next-succeeding element. This operation is achieved by switching the two integrators of each combined circuit by their connecting switch 71 or 72, and eliminates the need for a specific holding circuit.

The switches 71 and 72 permit a holding operation, since if the switch 71, for example, is in one position, the integrated output signal of the integrator from which it is disconnected is blocked, so that said integrated output is held at its next-preceding level. In other words, one of the two integrators of the combined circuits 41 and 45 or of the combined circuits 43 and 47 functions to integrate, since the corresponding switches 71 or 72 is connected thereto, and the other of said integrators holds the integrated output signal of the next-preceding element, since said corresponding switch is not connected thereto. In the next-succeeding element, the switches 71 and 72 change position so that the integrator, which previously functioned to integrate the signal supplied to it, then functions to hold the integrated output signal without modification and the other integrator, which previously functioned as a holding circuit, functions to integrate the signal supplied to it after it is reset.

FIGS. 3a and 3b comprise the demodulating circuit of the receiver. The demodulating circuit comprises the first and second phase detectors 13 and 15, the first and second integrators 16 and 18 and a sampling circuit 21. Although a single sampling circuit 21 is shown in the embodiment of FIG. 1, having the integrated output signals of both integrators 16 and 18 supplied thereto, two sampling circuits may be utilized. In such case, as illustrated in FIG. 3b, the first sampling circuit 21 would be connected to the output of the first integrator 16 and a second sampling circuit 81 would be connected to the output of the second integrator 18. The output signal of the second sampling circuit 81 is provided at an output terminal 82 via a lead 83 (FIG. 3b). A sampling pulse is supplied to the second sampling circuit 81 via a terminal 84 and a lead 85. The sampling pulse is supplied to the first sampling circuit 21 via the terminal 84, the lead 85 and a lead 86 (FIG. 3b).

The sampling circuits 21 and 81 of FIG. 3b function as sampling and shaping circuits and provide the output signals of channels 1 and 2, respectively. The operation of each of the sampling circuits 21 and 81 will be described with reference to the first sampling circuit 21. In the sampling circuit 21, transistors 87, 88 and 89 are connected as a peak-limiting amplifier. Transistors 91 and 92 are connected as a bistable multivibrator. The base potential of the transistor 87 is positive, the transistors 87 and 89 are switched to their conductive condition and the transistor 88 is switched to its nonconductive condition. When sampling pulses are supplied via the terminal 84 and the leads 85 and 86, they are supplied to capacitors 93 and 94 of the bistable multivibrator. The sampling pulses thus switch a diode 95 to its conductive condition and switch a diode 96 to its nonconductive condition. The transistor 91 of the bistable multivibrator is thus switched to its nonconductive condition and the transistor 92 of said multivibrator is switched to its conductive condition.

When the base potential of the transistor 87 of the peak-limiting amplifier is negative, the operation of the sampling circuit 21 is the reverse of that hereinbefore described. Thus, a waveform is provided by sampling and shaping the polarity of the output of the integrating circuit and is provided at the output terminal 24. In the modification of FIG. 3*b*, an output signal is also provided at the output terminal 82.

FIG. 4 is another embodiment of the present invention. In FIG. 4, the same circuit components or blocks which are included in the embodiment of FIG. 1, are labeled correspondingly with the components of FIG. 1. In the receiver of FIG. 3, the signals of three channels are phase multiplexed and said receiver receives phase modulated signals of eight phases. The receiver of FIG. 4 is almost equivalent to the receiver of FIG. 1 which provides phase modulation of four phases, but differs slightly from FIG. 1 in that it includes additional components.

In FIG. 4, a signal adding circuit 101 has an input connected to the output of the first integrator 16 via the lead 22 and a lead 102. The adding circuit 101 has another input connected to the output of the second integrator 18 via the lead 23 and a lead 103. A subtracting circuit 104 is connected in parallel with the adding circuit 101 and has an input connected to the output of the first integrator 16 via the leads 22 and 102 and a lead 105. The subtracting circuit 104 has another input connected to the output of the second integrator 18 via the leads 23 and 103 and a lead 106.

The output of the adding circuit 101 is connected to the input of a first sampling and shaping circuit 107 via a lead 108. The output of the subtracting circuit 104 is connected to the input of a second sampling and shaping circuit 109 via a lead 111. The output of the first sampling and shaping circuit 107 is connected to an input of an OR circuit 112 via a lead 113. The output of the second sampling and shaping circuit 109 is connected to another input of the OR circuit 112 via a lead 114. The output of the OR circuit is connected to an output terminal 115 via a lead 116. The output terminal 115 provides the third channel output.

Each of the adding circuit 101, the subtracting circuit 104 and the OR circuit 112 may comprise any suitable circuit known in the art. Each of the first sampling and shaping circuit 107 and the second sampling and shaping circuit 109 is the same as the corresponding one of the first sampling circuit 21 and the second sampling circuit 81.

As indicated by equations (14) and (15), the first integrator 16 has a DC component of $$AK\pi\, AK\pi(\theta i-\theta i{-}1-90^\circ)$$

and the second integrator 18 has a DC component of $$AK\pi\cos(\theta i-\theta i{-}1)$$

These components are changed, as shown by equation (16), when they are passed through the adding circuit 101.

$$AK\pi[\cos(\theta i{-}\theta i{-}1-90^\circ)+\cos(\theta i{-}\theta i{-}1)]$$
$$=\sqrt{2}\,AK\pi\cos(\theta i-\theta i{-}1-45^\circ) \qquad (16)$$

The DC components of the first and second integrators 16 and 18 are changed, as shown in equation (17), when they are passed through the subtracting circuit 104.

$$AK\pi[\cos(\theta i{-}\theta i{-}1-90^\circ)-\cos(\theta i{-}\theta i{-}1)]$$
$$=\sqrt{2}\,AK\pi\cos(\theta i{-}1+45^\circ) \qquad (17)$$

Output signals having phase differences of 45° are therefore detected. Thus, the demodulation of the signals of the third channel may be accomplished by deriving the OR of the first and second output signal.

The receiver of the present invention eliminates the need for an APC circuit comprising a closed loop and permits the utilization of an open loop circuit. This ensures more precise and stable operation. Furthermore, even when the transmission line transmits after being inactive for a considerable period of time, operation is instituted with rapidity, since there is no pull-in requirement as in a closed loop system. In the receiver of the present invention, only the phase difference between two elements adjacent to each other in time is provided and the magnitude of the phases of the other preceding elements have no influence, so that variations of the phase of the channel may also be followed without difficulty.

While the invention has been described by means of specific examples and in specific embodiments, I do not wish to be limited thereto, for obvious modifications will occur to those skilled in the art without departing from the spirit and scope of the invention.

I claim:

1. A frequency multiple differential phase modulation signal receiver, comprising:

input means for supplying a received input signal;

reference signal means for providing a first demodulating reference signal and a second reference signal having a phase difference of 90° from said first demodulating reference signal;

a demodulating circuit for demodulating the received input signal, said demodulating circuit comprising first and second phase detecting circuits having inputs connected to said input means and outputs for detecting the phase of the input signal, said phase detecting circuits utilizing the first demodulating reference signal and the second reference signal, a first integrating circuit having an output and an input connected to the output of said first phase detecting circuit and a second integrating circuit having an output and an input connected to the output of said second phase detecting circuit, and a sampling circuit having inputs connected to the outputs of said first and second integrating circuits for sampling the outputs of said integrating circuits and shaping the waveforms of said outputs;

reference signal means for providing a fourth reference signal having a phase difference of 90° from the single reference signal; and a demodulating reference signal circuit comprising signal generating means having an output for generating a single reference signal, third and fourth phase detecting circuits having inputs connected to said input means and outputs for detecting the phase of the input signal, said third and fourth phase detecting circuits utilizing the single reference signal and the fourth reference signal, a third integrating circuit having an output and an input connected to the output of said third phase detecting circuit and a fourth integrating circuit having an output and an input connected to the output of said fourth phase detecting circuit, a first holding circuit having an output and an input connected to the output of said third integrating circuit and a second holding circuit having an output and an input connected to the output of said fourth integrating circuit, each of said first and second holding circuits holding an integrated signal for a determined period, a first modulator having an output and an input connected to the output of said first holding circuit for modulating the output signals of said first holding circuit with the single reference signal and a second modulator having an output and an input connected to the output of said second holding circuit for modulating the output signals of said second holding circuit with the fourth reference signal, and a combining circuit having inputs connected to the outputs of said first and second modulators and the inputs of each of said first and second phase detecting circuits for combining the output signals of said modulators, said third integrating circuit and said first holding circuit being combined and said fourth integrating circuit and said second holding circuit being combined and each of said combined circuits comprising two integrating circuits, switch means connected to said integrating circuits and switch control means for controlling said switch means to integrate and hold signals supplied thereto.

2. A frequency multiple differential phase modulation signal receiver as claimed in claim 1, wherein said switch means of each of said combined circuits comprises a single switch.

3. A frequency multiple differential phase modulation signal receiver as claimed in claim 1, wherein said switch means of each of said combined circuits comprises a plurality of switches.

4. A frequency multiple differential phase modulation signal receiver as claimed in claim 1, further comprising an adding circuit connected to each of said first and second integrating circuits for adding signals supplied by said integrating circuits, a subtracting circuit connected to each of said first and second integrating circuits in parallel with said adding circuit for subtracting signals supplied by said integrating circuits, one from the other, a first sampling and shaping circuit connected to said adding circuit, a second sampling and shaping circuit connected to said subtracting circuit and OR circuit means connected to said first and second sampling and shaping circuits.

5. A frequency multiple differential phase modulation signal receiver as claimed in claim 4, wherein said switch means of each of said combined circuits comprises a single switch.

6. A frequency multiple differential phase modulation signal receiver as claimed in claim 4, wherein said switch means of each of said combined circuits comprises a plurality of switches.